(12) United States Patent
Miftakhutdinov

(10) Patent No.: US 7,202,643 B2
(45) Date of Patent: Apr. 10, 2007

(54) HIGH EFFICIENCY DC-TO-DC SYNCHRONOUS BUCK CONVERTER

(75) Inventor: Rais K. Miftakhutdinov, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/168,014

(22) Filed: Jun. 27, 2005

(65) Prior Publication Data
US 2006/0103363 A1  May 18, 2006

Related U.S. Application Data

(60) Provisional application No. 60/627,233, filed on Nov. 12, 2004.

(51) Int. Cl.
*G05F 1/618* (2006.01)
*G05F 1/46* (2006.01)
(52) U.S. Cl. .................. 323/224; 323/222; 323/351
(58) Field of Classification Search ........ 323/222–225, 323/271, 282, 285, 351; 327/589
See application file for complete search history.

(56) References Cited

U.S. PATENT DOCUMENTS 5,627,460 A * 5/1997 Bazinet et al. .............. 323/288
5,751,139 A * 5/1998 Jordan et al. ............... 323/222
5,905,370 A * 5/1999 Bryson ....................... 323/283
6,246,296 B1 * 6/2001 Smith ......................... 332/109
6,724,175 B1 * 4/2004 Matsuda et al. ............ 323/283

* cited by examiner

*Primary Examiner*—Gary L Laxton
(74) *Attorney, Agent, or Firm*—J. Dennis Moore; W. James Brady; Frederick J. Telecky, Jr.

(57) ABSTRACT

A DC-to-DC power regulator circuit, such as a synchronous buck DC-to-DC converter circuit, having improved efficiency. A power stage is provided, having an input port for receiving a DC input voltage and having an output port for providing a regulated DC output voltage. The power stage includes a control FET transistor having a first terminal, a second terminal, and a gate, the first terminal being connected to the input port. An energy storage element has a first terminal connected to the control FET output terminal and a second terminal connected to the output port. A driven FET transistor has a first terminal connected to ground, a second terminal connected to the first terminal of the energy storage element, and a gate. A driver circuit has an input adapted to receive a control signal, and provides first driver signal to the control FET gate and a second driver output signal to the driven FET gate. The driver circuit has a power supply node for receiving power to power the driver circuit, which is connected to a power supply external to the converter circuit. A driver powering circuit is arranged to derive power from the first terminal of the energy storage element and provide it to the power supply node of the driver circuit after an initial period of operation of the converter circuit.

6 Claims, 5 Drawing Sheets

HIGH EFFICIENCY DC-TO-DC SYNCHRONOUS BUCK CONVERTER

CROSS-REFERENCE TO RELATED APPLICATIONS

This application claims the benefit, under 35 U.S.C. § 119(e)(1), of U.S. Provisional Application No. 60/627,233, entitled "High Efficiency DC-to-DC Synchronous Buck Converter," having as its inventor Mr. Rais K. Miftakhutdinov, filed Nov. 12, 2004, and hereby incorporated herein by this reference.

TECHNICAL FIELD OF THE INVENTION

This invention relates to the field of power supplies. More particularly this invention relates to DC-DC power supplies including semiconductor switches in half-bridge configuration and controlled by complementary drive signals, such as synchronous buck DC-to-DC converters.

BACKGROUND OF THE INVENTION

Most low voltage electronic systems have a few different DC supply voltages providing the regulated power to various electronic functional blocks. Switched power supply regulator circuits are commonly employed, because of their high efficiency. One of the most popular types of switched power supply regulator circuit, for example, that converts an input DC voltage into a lower level output voltage for the functional circuitry, is the DC-to-DC synchronous buck converter.

The efficiency of a DC-DC converter is determined by the power dissipated in its power stage, and in its driver and controller circuit. The driver circuit can be implemented separately as a specialized IC, or it can be integrated into one package with the controller circuit. Power MOSFETs switching in a complementary mode are popular devices used as the switches in the DC-DC synchronous buck converter power stage. Such MOSFETs convert the DC input voltage into periodic pulses which, after filtering by a low pass filter, form the DC output voltage at a lower level determined by the duty cycle. An example 10 of such a converter circuit is shown in FIG. 1. Circuit 10 has a power stage 12 with a control MOSFET 13, a synchronous MOSFET 14, a control circuit 15 and a drive circuit 16.

In the converter circuit 10, the input voltage Vin is intermittently applied to an inductor L that provides an energy storage function, under control of control MOSFET 13 that acts as a switch under control of a driver circuit 16. A control circuit 15 provides a pulse input to the driver circuit 16, and the driver circuit 16, in turn, applies two complementary sets of gate drive pulses to the power MOSFETs, control FET 13 and synchronous FET 14, respectively. The synchronous MOSFET 14 closes a circuit loop during the OFF times of control FET 13, thereby allowing inductor L to discharge the energy stored during the ON time of control FET 13. Input capacitor Cin provides a filtering function by bypassing high frequency components, such as spikes, generated as a result of the "chopping" action on the DC input voltage Vin. Output capacitor Cout provides a filtering function to smooth the output voltage Vout, which is provided at a lower level than that of Vin.

The sets of pulses output by driver circuit 16 for the power stage MOSFETs both have amplitude Vdr. The pulses for the control MOSFET 13 have a duty cycle D, while the pulses for the synchronous MOSFET 14 have a duty cycle (I-D), as shown in FIG. 2. The duty cycle D is set by the control circuit 15, to thereby regulate the output voltage Vout at the required level.

In multi-phase configuration, the power stage 12 and driver circuit 16 are multiplied in accordance to the number of phases, while one control circuit distributes phase shifted control pulses to drivers in each phase, thus accomplishing lower spike and ripple current through the input and output filter capacitors Cin and Cout, respectively. A schematic of a multi-phase synchronous buck DC-to-DC converter 30 of this type is shown in FIG. 3. Converter 30 may be built from commercially available ICs. The particular chipset shown in the figure supports up to four DC-to-DC converters, with only two being shown for clarity. Pin designations are conventional, for example PWMn(n=1, 2, 3, 4) referencing the pulse width modulated pulsed outputs of control circuit IC 31, PWM referencing the pulse width modulated pulsed input for driver circuit ICs 32 and 33, UGATE and LGATE referencing the gate drive pulses for the "upper," i.e., control MOSFET and "lower," i.e., synchronous MOSFET, respectively, and CS referencing current sense signals, for auxiliary control circuitry (not shown) such as current limit, for example.

The efficiency of a DC-to-DC converter is an important issue that needs to be addressed by the circuit designer. As mentioned above, the efficiency of a DC-to-DC converter is determined by the power dissipated in its power stage, for example stage 12 of converter 10, and in the drive and control circuits, for example units 16 and 15, respectively, of converter 10. As a general matter, the power dissipation, Pcond, of the power stage is influenced by the resistance Rds(on) of the switches, e.g., MOSFETs 13 and 14 of converter 10. Specifically:

$$Pcond = Irms^2 \times Rds(\text{on}) \qquad \text{Eq. (1)}$$

where Irms is the root mean square current through the switch. The drain to source resistance of MOSFETs in their ON state, Rds(on), is inversely proportional to their drive, i.e. gate-to-source, voltage Vgs. Consequently, a higher drive voltage results in less power being dissipated by the power stage of the converter. Typical curves illustrating how the Rds(on) of power MOSFETs depends on the drive voltage applied between their gate and source are shown in FIG. 4.

Examining this in more detail, the power Pdr dissipated by the drive circuit 16 can be expressed in equation form. The voltage applied to the gate of the MOSFET depends on the charge delivered to the gate. This dependence is shown graphically in FIG. 5. For a given drive (gate to source) voltage Vgs, the power dissipated by the driver circuit is proportional to the drive voltage of the MOSFET, to the gate charge Qgs of the MOSFET and to the switching frequency Fsw:

$$Pdr = Vgs \times Qgs \times Fsw. \qquad \text{Eq. (2)}$$

The gate charge of the MSOFET is given by the following equation:

$$Qgs = Cgs \times Vgs, \qquad \text{Eq. (3)}$$

where Cgs is the gate to source capacitance of the MOSFET. Thus, the driver losses are proportional to the square of the gate-to-source voltage:

$$Pdr = Cgs \times Vgs^2 \times Fsw. \qquad \text{Eq. (4)}$$

Comparing Equation (1) for the MOSFET conduction losses, Pcond, with Equation (4) for the driver losses, Pdr, it can be seen that there is an optimal drive voltage that provides the lowest power losses and highest efficiency for the synchronous buck converter in a selected load current range. This is illustrated graphically in FIG. 6 for three different gate-source (drive) voltages, 5V, 7V and 12V, where the graph is a plot of converter efficiency, as a percentage, against load current. The curve where the drive voltage is 7V provides the highest efficiency in a broad current load range, and is shown by a dashed line curve in the graph.

Input supply voltages, readily available in the typical power distribution system, are standardized, and they are not available for the highest efficiency drive voltage. For example, a 5V drive voltage, shown by an alternating long dash, short dash line curve in the graph, results in lower efficiency at the maximum load current. On the other hand, a 12V drive voltage, shown by a solid line curve in the graph, has low efficiency at middle range to light loads. Moreover, at higher drive voltages, such as 12V, the driver IC dissipates an increasing, and significant amount of power as the switching frequency and number of driven MOSFETs increase. This can result in temperature overstresses inside the driver IC. In some applications, the input voltage that is available varies in a wide range, so it cannot be used directly as the supply voltage for the driver circuit because it may exceed the safe operating region of the driver, or degrade the overall efficiency of the converter.

It would therefore be desirable to increase the overall efficiency of DC-DC synchronous buck converters across a wide load current range, to decrease the power dissipated by the driver circuit in such converters, and to increase the reliability of such driver circuits, without sacrificing the efficiency across the wide load current range. It would, of course, also be desirable that any solution meeting these objectives be simple and inexpensive.

Straightforward approaches to meeting these objectives, involving adding an additional power supply to generate the required optimal drive voltage from the available input supply voltage, are possible. If a high-efficiency switching DC-to-DC converter is used to solve the problem, it is expensive. One of the more popular and relatively low cost solutions uses a linear power supply, and is shown in FIG. 7.

The circuit 70 shown in FIG. 7 may be provided in an IC that is external to the driver IC. However, in many cases a more complex, integrated version of a linear regulator is placed inside the driver IC for convenience. However, this solution has several drawbacks. First, it dissipates additional power, approximately 50% of the power that could be saved if the optimal drive voltage were readily available. Second, it requires that the input supply voltage be higher than the optimal drive voltage, which may be an unacceptable limitation. Third, in cases where the linear regulator is integrated into the driver IC, the additional dissipated power limits the switching frequency of the converter and the number of MOSFETs that can be driven. Finally, the integrated version requires a more expensive package for the driver IC because of this increased dissipated power, the higher voltage devices used inside the chip, and the extra pins that need to be added for the input and output of the linear regulator.

An alternative approach is to use a more efficient DC-to-DC converter to generate an optimized drive voltage. Basically, this involves replicating the circuit shown in FIG. 1, but designing it for much lower power than the main DC-to-DC converter. However, such an approach is expensive.

SUMMARY OF THE INVENTION

The present invention provides a DC-to-DC power regulator circuit having improved efficiency. A power stage is provided, having an input port for receiving a DC input voltage and having an output port for providing a regulated DC output voltage. The power stage includes a control FET transistor having a first terminal, a second terminal, and a gate, the first terminal being connected to the input port. An energy storage element has a first terminal connected to the control FET output terminal and a second terminal connected to the output port. A driven FET transistor has a first terminal connected to ground, a second terminal connected to the first terminal of the energy storage element, and a gate. A driver circuit has an input adapted to receive a control signal, and provides first driver signal to the control FET gate and a second driver output signal to the driven FET gate. The driver circuit has a power supply node for receiving power to power the driver circuit, which is connected to a power supply external to the converter circuit. A driver powering circuit is arranged to derive power from the first terminal of the energy storage element and provide it to the power supply node of the driver circuit after an initial period of operation of the converter circuit.

These and other aspects and features of the invention will be apparent to those skilled in the art from the following detailed description of the invention, taken together with the accompanying drawings.

DETAILED DESCRIPTION OF THE PREFERRED EMBODIMENT

In general, the present invention provides a DC-to-DC power regulator circuit that uses the pulsed voltage at the phase node of a power stage to generate the required optimal drive voltage. In preferred embodiments, it includes a small inductor that has one end connected to the phase node and a second end connected to the anode of a diode. The cathode of this diode is connected to the supply pin of the drive circuit. In this way, as soon as the converter has started and generates pulses, it is able to provide the optimal supply voltage for its own drivers. In the preferred embodiments. it is desirable to select the inductance of the added inductor in such a way that the current flowing through the inductor is discontinuous. This allows using the same pulse width modulated (PWM) pulses at the phase node of the power stage to generate both the main output DC voltage and the additional voltage for the drive circuit that, in most cases, is at a different level from the main output. In the present invention, the standard, input voltage, which may be non-optimal for drive, is used only during the start-up of the converter, and then as back-up during shutdown, when both power MOSFETs are off.

Figure 1:
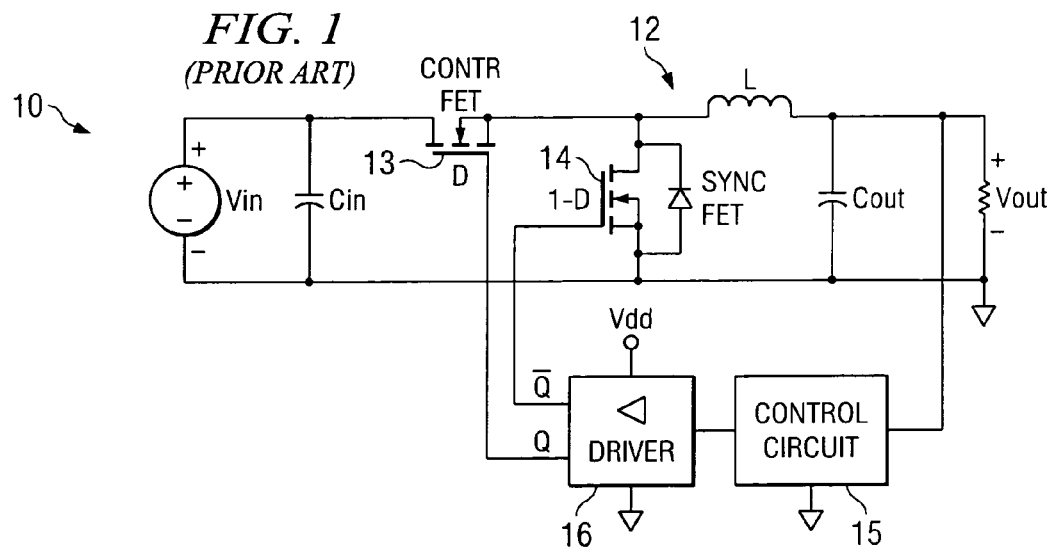
FIG. 1 is a diagram of an exemplary prior art synchronous buck DC-to-DC converter circuit.
Figure 2:
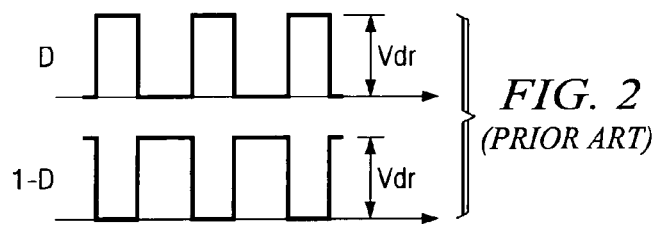
FIG. 2 is a graph of voltage versus time for the output pulses of drive circuit 16 of FIG. 1.
Figure 4:
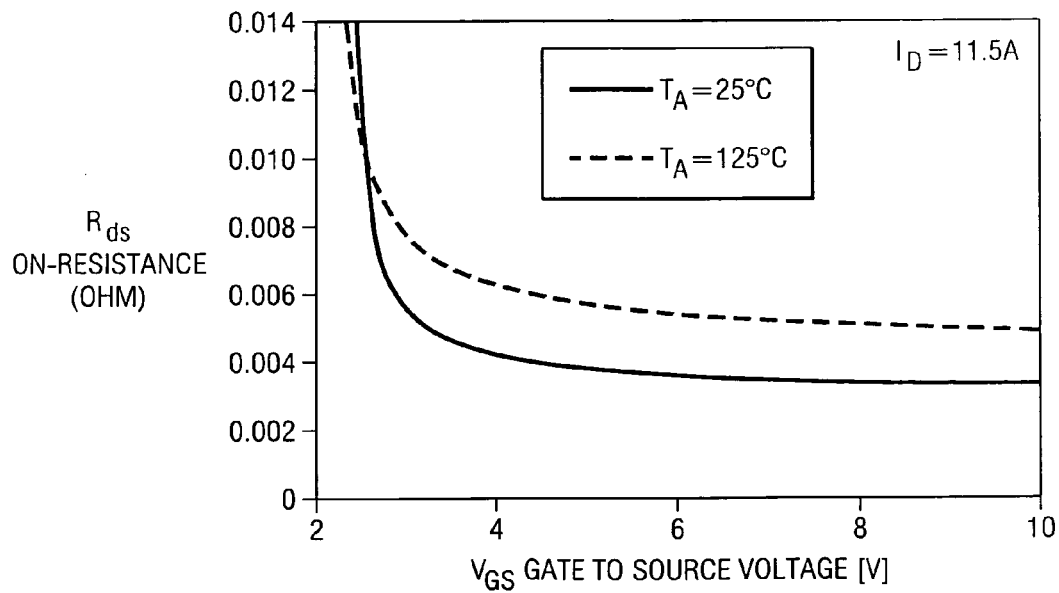
FIG. 4 is a graph of Rdson versus Vgs for a typical power MOSFET.
Figure 8:
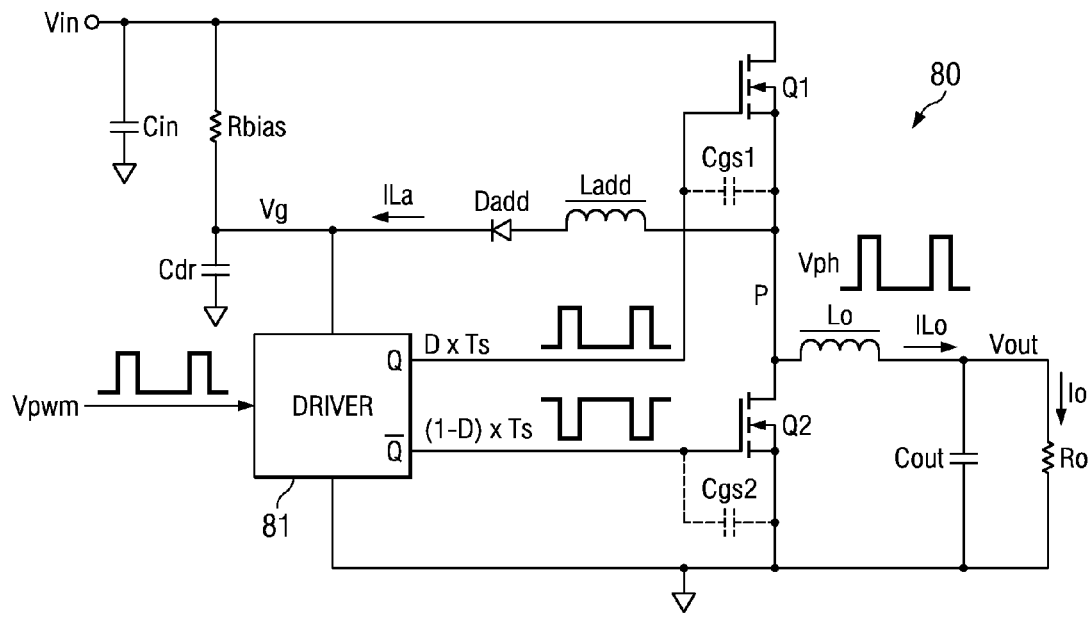
FIG. 8 is a diagram of a first embodiment of a two phase synchronous buck DC-to-DC converter circuit in accordance with the present invention.

A first exemplary implementation of a one phase synchronous buck converter 80 according to the present invention is shown in FIG. 8 for driving a load Ro. Similar to the converter shown in FIG. 1, in converter 80 a control MOSFET Q1 and a synchronous MOSFET Q2 are provided, as are an energy storage inductor Lo and an input capacitor Cin and an output capacitor Cout, connected as shown. A conventional control circuit, not shown in the figure, provides a pulse width modulated stream of pulses to a driver circuit 81, similar to the prior art. Also as in the prior art, the pulses for the control MOSFET Q1 have a duty cycle D, while the pulses for the synchronous MOSFET Q2 are complementary to the control pulses and have a duty cycle (I-D). Thus, the duration of the control pulses is D×Ts, while the duration of the synchronous pulses is (1−D)×Ts, where Ts is the period of a switching cycle.

Also provided in converter 80, however, are an additional inductor Ladd and a diode Dadd connected in series between the phase node P, i.e., the common node of MOSFETs Q1 and Q2, and the Vg supply pin of the driver circuit 81, with the cathode of diode Dadd being connected to the Vg supply pin and its anode to inductor Ladd. Also provided are a bias resistor Rbias and a driver capacitor Cdr connected in series between the input and ground, with one terminal of resistor Rbias being connected to the input and one plate of capacitor Cdr being connected to ground. The common connection of resistor Rbias and capacitor Cdr is connected to the Vg supply pin of driver circuit 81.

In operation, the pulsed voltage Vph at the phase node P is used to generate the required optimal drive voltage Vg. Initially, the energy to the driver is provided through resistor Rbias to charge capacitor Cdr. As soon as the converter starts and generates the first pulses at the phase node P, the supply voltage to the driver circuit 81 is provided through inductor Ladd and diode Dadd. In accordance with the principles of the invention, the inductance value of inductor Ladd is selected to ensure that the power delivered through inductor Ladd is sufficient to maintain the drive voltage Vg at its optimum level. The inductance of inductor Ladd should not be higher than the value determined from the following equation for the worst case:

$$Ladd \leq \frac{Vomin^2 \times \left(1 - \frac{Vgmin}{Vinmin}\right) \times Tsmin^2}{2 \times Cgsmax \times Vgmin^2}, \qquad \text{Eq. (5)}$$

where Vomin is the minimum output voltage Vout, Vgmin is the minimum drive voltage Vg, Vinmin is the minimum input voltage Vin, Tsmin is the minimum period of a switching cycle Ts and Cgsmax is the maximum gate to source capacitance Cgs of the MOSFET Q1. The current through inductor Ladd determined by Equation (5) is discontinuous. This allows using the same pulses at the phase node P to generate both the main DC output voltage Vout as well as the additional voltage Vg for the drive voltage Vg supply pin of the driver circuit 81, which is higher than the main output voltage Vout. Thus, the embodiment of FIG. 8 is particularly suitable for converters having a Vout that is less than 5V.

Figure 9:
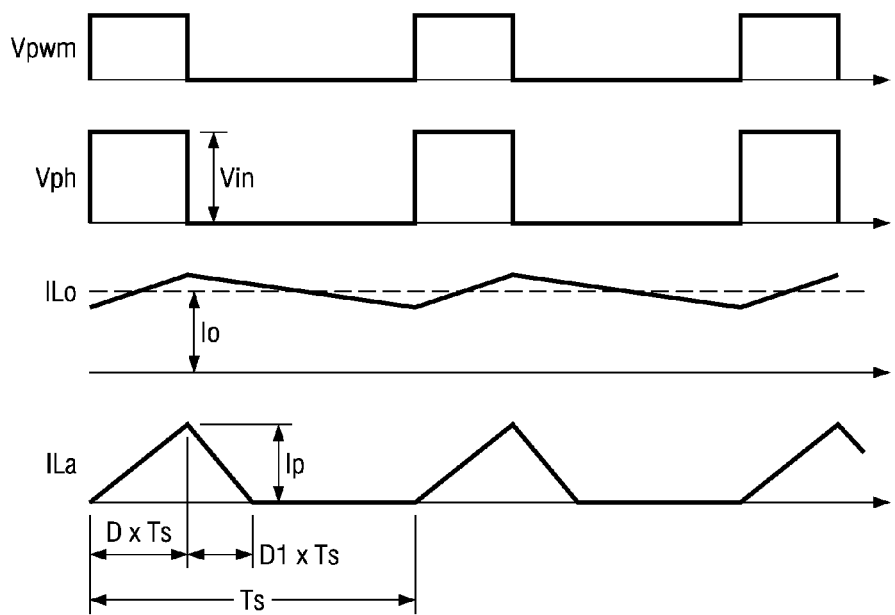
FIG. 9 is a graph of several signals generated during operation of the converter circuit of FIG. 8.

FIG. 9 is a timing diagram showing the input pulses Vpwm, the related phase node voltage Vph and the currents through the main inductor ILo and the additional inductor ILa, vertically aligned in time, for the circuit of FIG. 8. Note that while the rise times of the AC component of ILo and the rise time of ILa are the same, namely D×Ts, the fall times are different for the two currents. The fall time for the AC component of ILo is (1−D)×Ts, but, because the current through Ladd is discontinuous its fall time is D1×Ts, where D1 is something less than (1−D). Preferably, the value Rbias of resistor Rbias is selected to make the bias current flowing through it very small, to minimize power losses. However, the selected bias current should be large enough to provide the quiescent current Iqsc of driver 81 and to charge the capacitor Cdr fast enough to meet start-up timing requirements of the circuit 80. For example, the following Equations (6) and (7) can be used to estimate Rbias for given quiescent current Iqsc and start-up time Tstart:

$$Rbias \leq \frac{Vinmin - Vg}{Iqsc} \text{ and} \qquad \text{Eq. (6)}$$

$$Rbias \leq \frac{Tstart}{3 \times Cdr}. \qquad \text{Eq. (7)}$$

The bias circuit is used only during start-up of the converter 80, and as back-up after shutdown when both power MOSFETs are off and there are no pulses at the phase node P.

Figure 3:
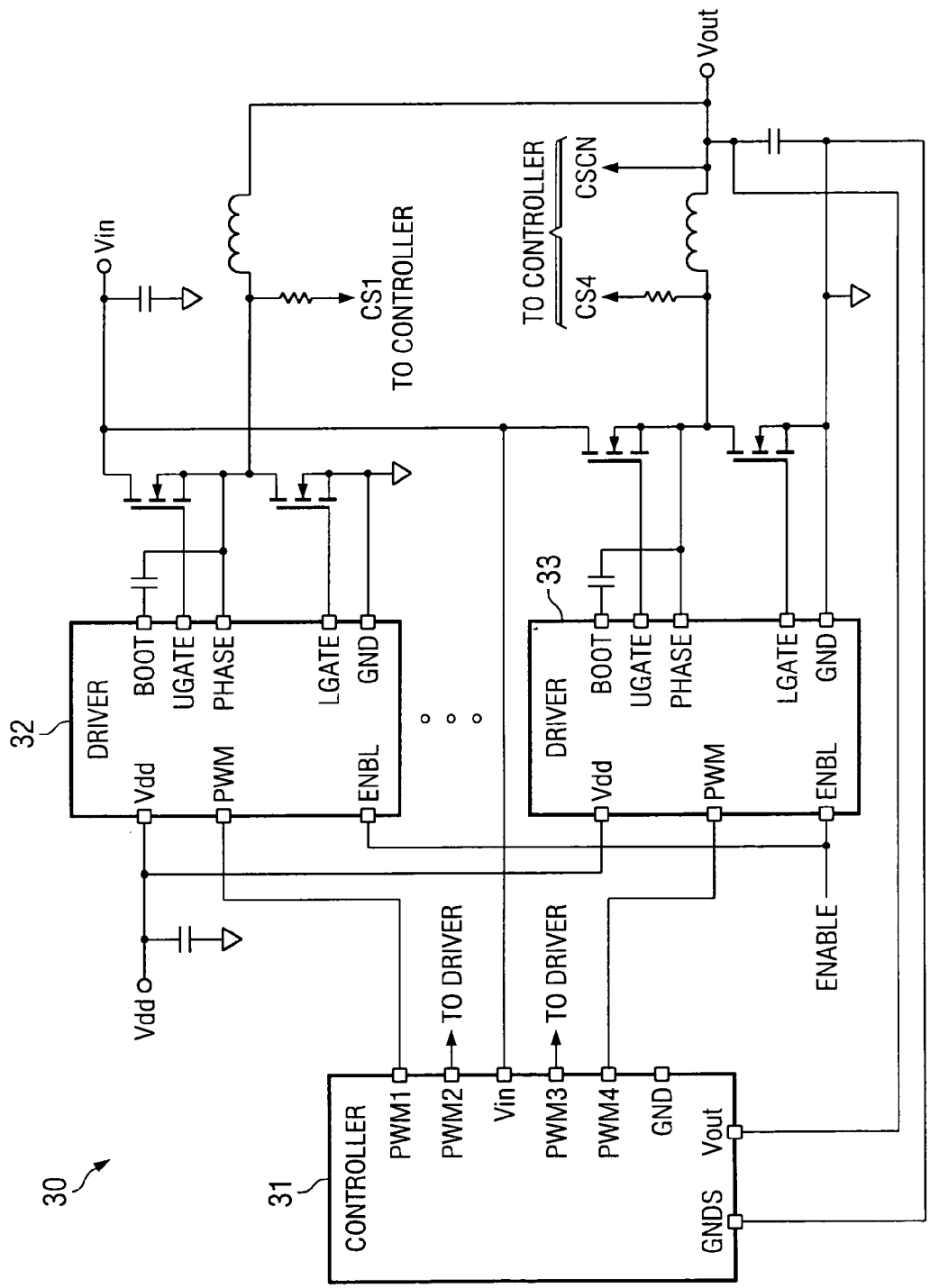
FIG. 3 is a diagram of an exemplary prior art multi-phase synchronous buck DC-to-DC converter circuit.
Figure 5:
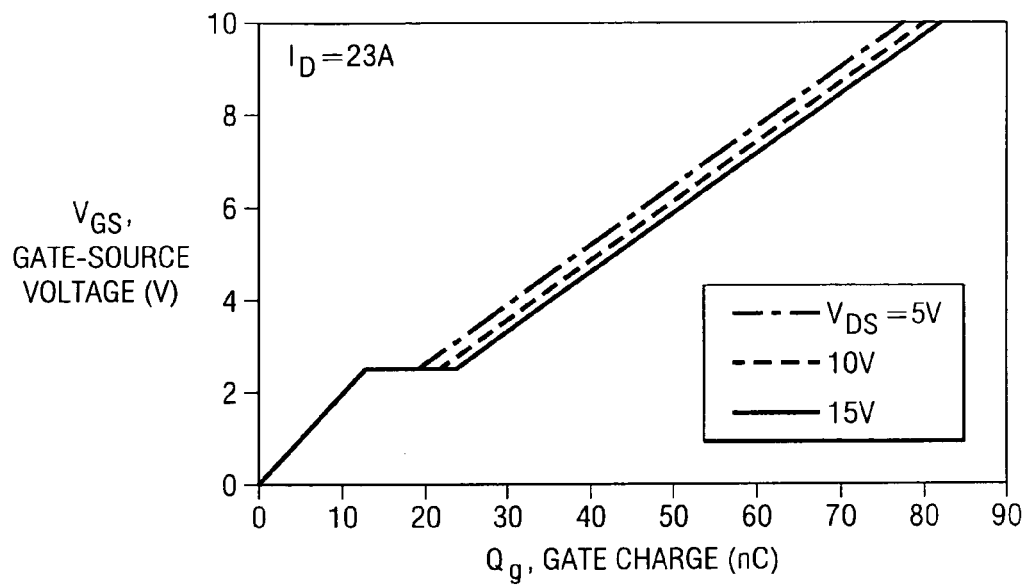
FIG. 5 is a graph of gate-to-source voltage versus gate charge for a typical power MOSFET.
Figure 6:
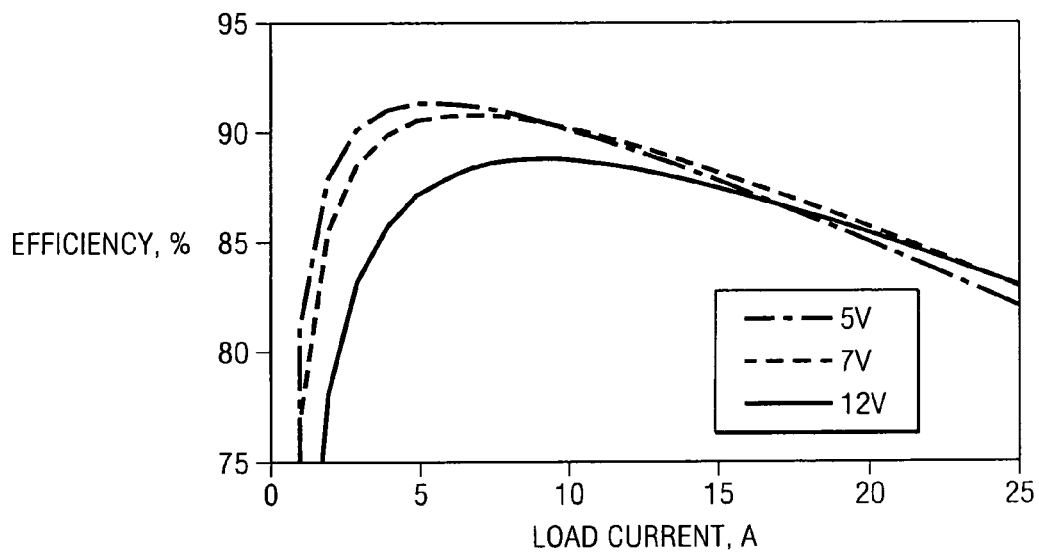
FIG. 6 is a graph of the efficiency of a typical synchronous buck DC-to-DC converter circuit versus its load current for different drive (gate-to-source) voltages.
Figure 7:
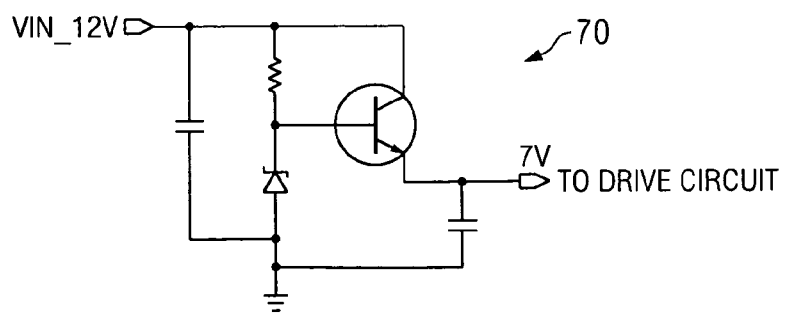
FIG. 7 is a diagram of an exemplary prior art linear power supply for use with a synchronous buck DC-to-DC converter circuit.

In the case of multi-phase synchronous converters, such as converter 30 of FIG. 3, in applying the principles of the invention such as shown in FIG. 8, inductor Ladd and diode Dadd may be replicated in the driver circuit for each phase or, alternatively, the inductor Ladd and diode Dadd for just one phase can be used to supply the drive voltage for each phase. The latter approach requires a larger inductor Ladd and diode Dadd. Also in the latter approach, the phase selected to supply the drive voltage draws some additional current as compared with other phases in order to provide the required power to the drive circuit.

Figure 10:
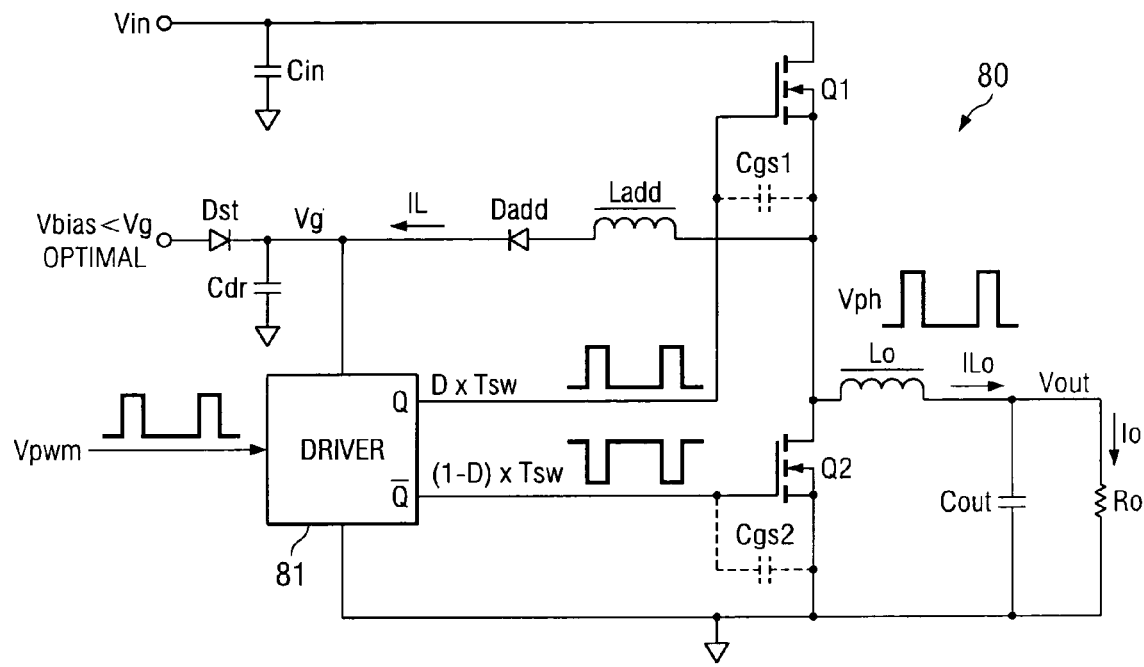
FIG. 10 is a diagram of a second embodiment of a two phase synchronous buck DC-to-DC converter circuit in accordance with the present invention.

In many cases, the additional supply voltage is available for the initial bias voltage, but it is lower than optimal. For such applications, the Rbias resistor may be removed from the main supply and the additional supply voltage provided to the driver circuit through a diode. Such an embodiment is shown in FIG. 10, wherein the diode through which the additional power supply supplying Vbias is designated Dst. In operation, after a few initial phase node pulses, the Vg voltage rises above Vbias. Thus, during normal operation there is no power consumption from the additional supply voltage. Only the additional inductor Ladd and diode Dadd provide the supply voltage to the driver circuit working in an efficient switching mode, with minimum power consumption.

An equation can be derived that shows how the drive voltage Vg depends on the input voltage Vin and the output voltage Vout. First, the behavior of the driver circuit as a load for the driver supply voltage is considered. Equation (4), above, duplicated here, set forth the power consumed by the driver circuit:

$$Pdr = Cgs \times Vgs^2 \times Fsw. \quad \text{Eq. (4)}$$

Assuming that Vg≈Vgs, Cgs=Cgs1+Cgs2, shown as dashed line capacitor symbols for their respective MOSFETs in FIG. 8, and Fsw=1/Ts, the drive power Pg may be expressed as:

$$Pg = \frac{(Cgs1 + Cgs2) \times Vg^2}{Ts} \quad \text{Eq. (8)}$$

The power, Pladd, provided by the inductor Ladd to the driver circuit may be expressed as:

$$Pladd = \frac{Ladd \times Ip^2}{2 \times Ts} + \frac{Vg \times Ip \times D}{2}, \quad \text{Eq. (9)}$$

where Ip is the peak current through inductor Ladd. The following may be substituted into Equation (9):

$$Ip = \frac{(Vin - Vg) \times D \times Ts}{Ladd}, \text{ and} \quad \text{Eq. (10)}$$

$$D = \frac{Vout}{Vin}, \quad \text{Eq. (11)}$$

which yields:

$$Vg = \frac{\sqrt{A \times (A + 4 \times Vin^2)} - A}{2 \times Vin}, \text{ where} \quad \text{Eq. (12)}$$

$$A = \frac{(Vout \times Ts)^2}{2 \times Ladd \times Cgs}. \quad \text{Eq. (13)}$$

Figure 11:
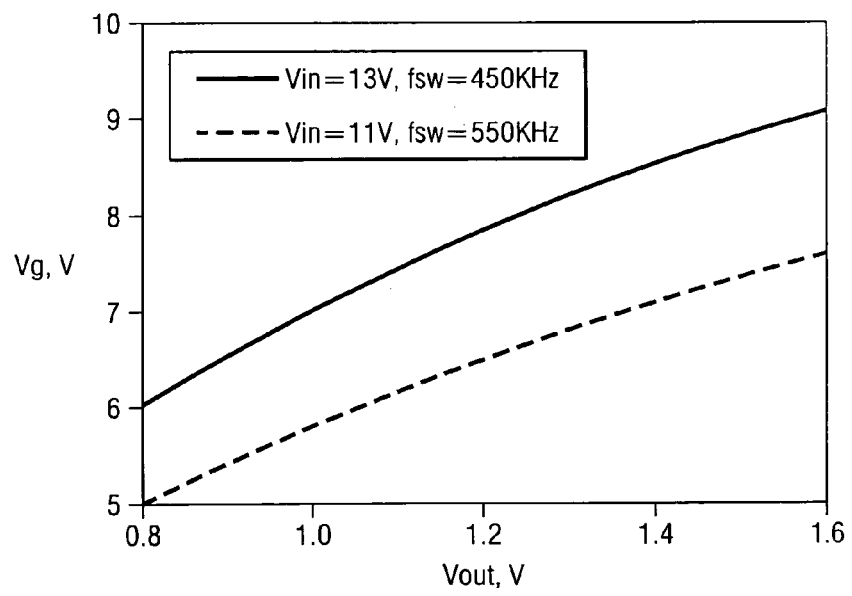
FIG. 11 is a graph of drive voltage versus output and input voltages of a synchronous buck DC-to-DC converter circuit in accordance with the present invention.

Because the driver circuit consumes almost constant current during the switching, Vg voltage regulation does not need to be too accurate. The driver circuit current is proportional to the switching frequency and the number of driven power FETs. At the optimal driver voltage region, which is from approximately 6V to 8V in many applications, the efficiency varies little. The typical Vg voltage variation as a function of the main output voltage Vout for a switching frequency range of 450 kHz to 550 kHz, and for an input voltage range of 11V to 13V is shown in FIG. 11, which is a graph of Vg against Vout. The curve for 450 kHz is marked with diamonds, while the curve for 550 kHz is marked with "X"s. It can be seen in the figure that the drive voltage variation is within the optimal region even for these two worst case tolerances and wide variation of output voltage.

It has been shown that the various embodiments of the present invention provide synchronous buck DC-to-DC converters having a high overall efficiency over a wide load current range. These embodiments have low drive power losses, which allows higher switching frequency operation. The drive circuit of these embodiments consumes only minimum bias current power from the input drive voltage, and in some conditions none at all, for example during nominal operation relying on the main power stage and input voltage to supply the drive current and voltage. The low dissipated power inside the driver IC eliminates the thermal overstresses found in prior art approaches, and allows the use of cheaper, smaller packages having a smaller number of pins. The drive IC can be designed around the optimal drive voltage, thus saving silicon area and cost. In addition, there is no need to design the driver to be able to accept all standard input Vdd voltages, which voltages may be much higher then necessary. Embodiments of the present invention require only a small number of low cost parts, while providing the same efficiency as prior art arrangements, as contrasted with the "solution" of using an additional standby switching regulator to provide the optimal drive voltage. Embodiments of the present invention save up to 50% of dissipated power in the drive circuit as compared with popular solutions having an additional linear regulator. In multi-phase configurations, embodiments of the present invention are capable of driving more power MOSFETs per phase, thus reducing the number of phases and cost of the whole system for the same required load current.

Although the present invention and its advantages have been described in detail, it should be understood that various changes, substitutions and alterations can be made herein without departing from the spirit and scope of the invention as defined by the appended claims. For example, any half-bridge configuration of two switches that are switched in a complementary mode and have an acceptable duty cycle range to ensure discontinuous operation of Ladd after start-up can be used in accordance with this invention.

What is claimed is:

1. A DC-to-DC power regulator circuit, comprising:
    a power stage having an input port for receiving a DC input voltage and having an output port for providing a regulated DC output voltage, including
        a control FET transistor having a first terminal, a second terminal, and a gate, the first terminal being connected to the input port,
        an energy storage element having a first terminal connected to the second terminal of the control FET and a second terminal connected to the output port, and
        a driven FET transistor having a first terminal connected to ground, a second terminal connected to the first terminal of the energy storage element, and a gate;
    a driver circuit having an input adapted to receive a control signal, and providing a first driver signal to the control FET gate and a second driver output signal to the driven FET gate, the driver circuit having a power supply node for receiving power to power the driver circuit, the power supply node being connected to a power supply external to the converter circuit; and
    a driver powering circuit arranged to derive power from the first terminal of the energy storage element and provide it to the power supply node of the driver circuit at an optimized voltage for efficiency of operation, after an initial period of operation of the converter circuit, the driver powering circuit comprising an inductor and a diode connected in series between the first terminal of the energy storage element and the power supply node of the driver circuit.

2. A converter circuit as in claim 1 wherein the value of the inductor is selected in accordance with the inequality:

$$Ladd \leq \frac{Vomin^2 \times \left(1 - \frac{Vgmin}{Vinmin}\right) \times Tsmin^2}{2 \times Cgs\,max \times Vgmin^2},$$

where Ladd is the value of the inductor, Vomin is the minimum output voltage, Vgmin is the minimum drive voltage, Vinmin is the minimum input voltage, Tsmin is the minimum period of a switching cycle and Cgsmax is the maximum gate to source capacitance of the control FET transistor.

3. A synchronous buck DC-to-DC converter circuit, comprising:
- a power stage having an input port for receiving a DC input voltage and having an output port for providing a regulated DC output voltage, including
  - a control FET transistor having a first terminal, a second terminal, and a gate, the first terminal being connected to the input port,
  - an energy storage element having a first terminal connected to the second terminal of the control FET and a second terminal connected to the output port, and
  - a synchronous FET transistor having a first terminal connected to ground, a second terminal connected to the first terminal of the energy storage element, and a gate;
- a driver circuit having an input adapted to receive a control signal, and providing a first driver signal to the control FET gate and a second driver output signal to the synchronous FET gate, the driver circuit having a power supply node for receiving power to power the driver circuit, the power supply node being connected to a power supply external to the converter circuit; and
- a driver powering circuit arranged to derive power from the first terminal of the energy storage element and provide it to the power supply node of the driver circuit at an optimized voltage for efficiency of operation, after an initial period of operation of the converter circuit, the driver powering circuit comprising an inductor and a diode connected in series between the first terminal of the energy storage element and the power supply node of the driver circuit.

4. A converter circuit as in claim 3 wherein the value of the inductor is selected in accordance with the inequality:

$$Ladd \leq \frac{Vomin^2 \times \left(1 - \frac{Vgmin}{Vinmin}\right) \times Tsmin^2}{2 \times Cgs\,max \times Vgmin^2},$$

where Ladd is the value of the inductor, Vomin is the minimum output voltage, Vgmin is the minimum drive voltage, Vinmin is the minimum input voltage, Tsmin is the minimum period of a switching cycle and Cgsmax is the maximum gate to source capacitance of the control FET transistor.

5. A synchronous buck DC-to-DC converter circuit, comprising:
- a power stage having an input port for receiving a DC input voltage and having an output port for providing a regulated DC output voltage, including
  - a control FET transistor having a first terminal, a second terminal, and a gate, the first terminal being connected to the input port,
  - an energy storage element having a first terminal connected to the second terminal of the control FET and a second terminal connected to the output port, and
  - a synchronous FET transistor having a first terminal connected to ground, a second terminal connected to the first terminal of the energy storage element, and a gate;
- a control circuit having an input connected to the output port, and an output;
- a driver circuit having an input connected to the output of the control circuit, and providing a first driver signal to the control FET gate and a second driver output signal to the synchronous FET gate, the driver circuit having a power supply node for receiving power to power the driver circuit, the power supply node being connected to an power supply external to the converter circuit; and
- a driver powering circuit arranged to derive power from the first terminal of the energy storage element and provide it to the power supply node of the driver circuit at an optimized voltage for efficiency of operation, after an initial period of operation of the converter circuit, the driver powering circuit comprising an inductor and a diode connected in series between the first terminal of the energy storage element and the power supply node of the driver circuit.

6. A converter as in claim 5 wherein the value of the inductor is selected in accordance with the inequality:

$$Ladd \leq \frac{Vomin^2 \times \left(1 - \frac{Vgmin}{Vinmin}\right) \times Tsmin^2}{2 \times Cgs\,max \times Vgmin^2},$$

where Ladd is the value of the inductor, Vomin is the minimum output voltage, Vgmin is the minimum drive voltage, Vinmin is the minimum input voltage, Tsmin is the minimum period of a switching cycle and Cgsmax is the maximum gate to source capacitance of the control FET transistor.

* * * * *